United States Patent Office 3,209,706
Patented Oct. 5, 1965

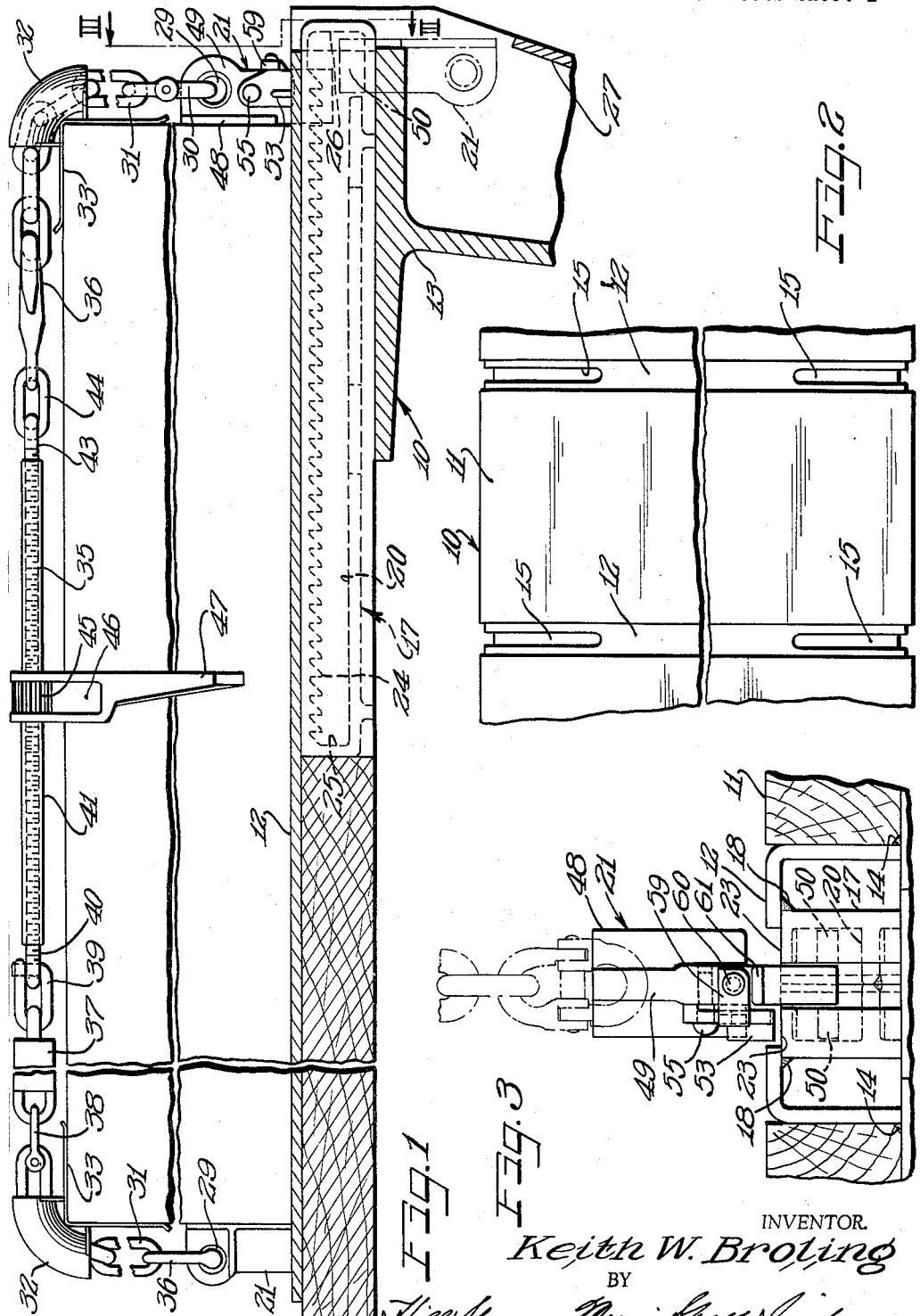

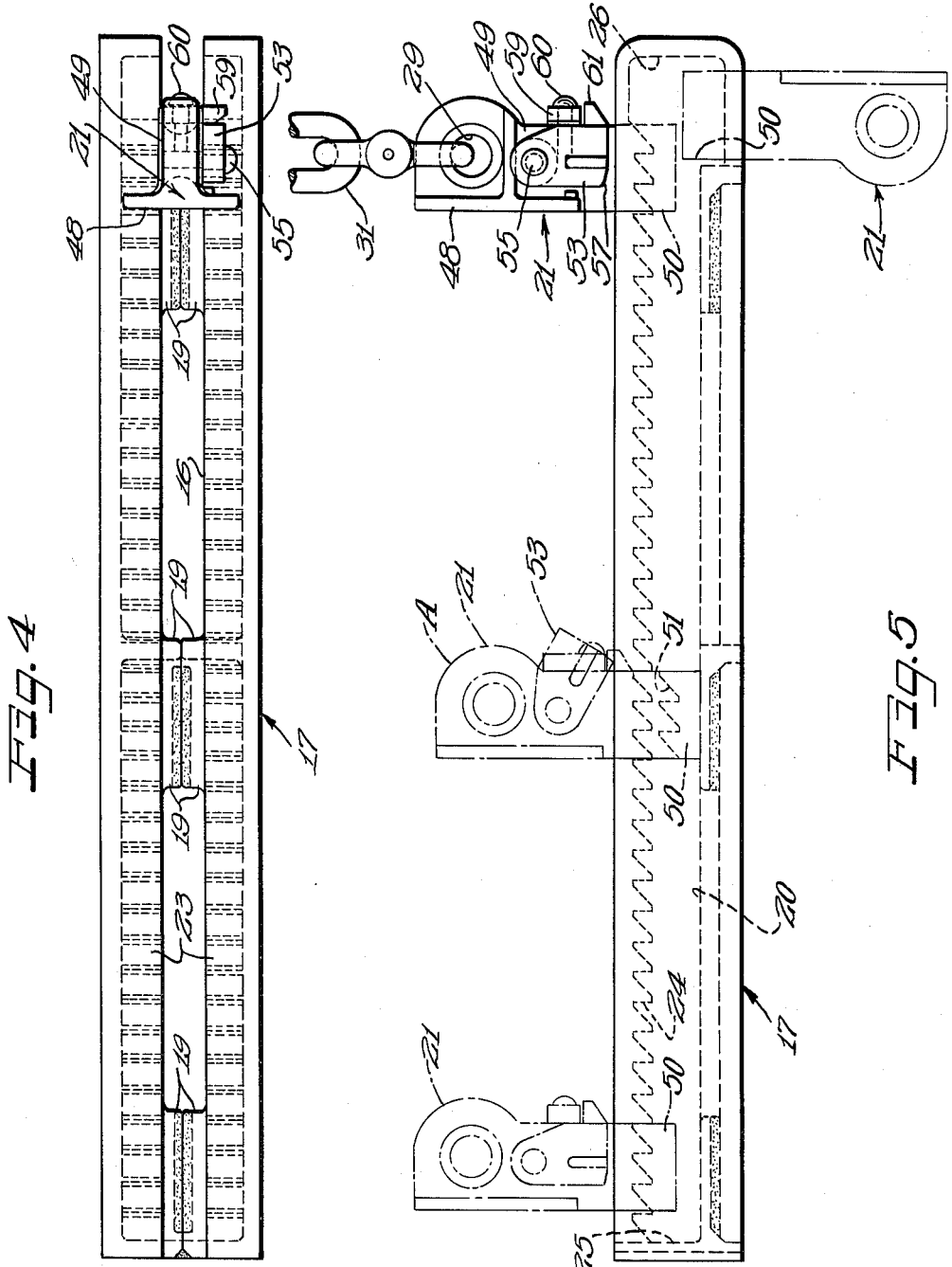

3,209,706
ADJUSTABLE TIE ANCHOR
Keith W. Broling, Homewood, Ill., assignor to Brandon Equipment Company, Inc., Chicago, Ill., a corporation of Illinois
Filed Sept. 16, 1963, Ser. No. 309,076
5 Claims. (Cl. 105—369)

This invention relates to improvements in structures for holding down loads on vehicles, such as freight cars, automotive vehicles and the like.

In transporting stacked articles, such as stacked or bundled wallboard, plywood, plasterboard, lumber, brick or even metal plates or pipe, the articles usually abut a bulkhead at each end of the vehicle and are held from lateral shifting movement by chains or stakes extending over the top of the load and tied to opposite sides of the vehicle. Where, however, the load is narrower than the width of the vehicle, it is difficult to adequately adjust the tying chains or stakes to hold the load from lateral shifting movement.

The present invention relates to a tie down means particularly adapted to tie wallboard or other stacked, banded or bundled articles to a vehicle, such as a freight car or truck, in which tie down chains extend upwardly along opposite sides of the load and can be laterally adjusted and tightened to the load to hold the load from lateral shifting movement during transportation.

It is, accordingly, a principal object of the present invention to provide a tie down for tying down loads on vehicles in which tie anchors are adjustable inwardly and outwardly of the sides of the vehicle and are provided at opposite sides of the vehicle to effect ready adjustment of the tie down to the articles to be transported, and thereby prevent lateral shifting movement thereof.

Another object of the invention is to provide an improved form of tie down for vehicles particularly adapted to tie down stacked, packaged or bundled articles to a flat car and the like and prevent lateral shifting movement of the load, in which adjustable tie anchors are provided, which are readily locked in position along side the load, by merely pulling upwardly on the tie anchors.

A further object of the invention is to provide an improved form of anchoring device for the tie down chain, for tying a load to a vehicle, in which the anchoring device is laterally adjustable of the vehicle body and is provided with gravity locking means, locking the anchoring device in position by the mere vertical pulling action on the device, and is so arranged as to be readily stowed beneath the floor of the vehicle body when not in use.

These and other objects of the invention will appear from time to time as the following specification proceeds and with reference to the accompanying drawings wherein:

FIGURE 1 is a fragmentary end view of a vehicle body with certain parts broken away and certain parts shown in section, and illustrating an adjustable tie down device constructed in accordance with the principles of the present invention;

FIGURE 2 is a fragmentary top plan view of a vehicle body, illustrating a form of mounting for the tie down or anchoring device;

FIGURE 3 is a fragmentary sectional view taken substantially along line III—III of FIGURE 1;

FIGURE 4 is a top plan view of a tie anchor constructed in accordance with the principles of the present invention showing a chain anchor carried thereby; and FIGURE 5 is a view in side elevation of the tie anchor of FIGURE 4, showing the chain anchor in locked and released positions with respect to the tie anchor.

In the embodiment of the invention illustrated in the drawings I have shown in FIGURE 1, a vehicle 10, which may be a freight car or the body of a trailer or truck. The vehicle 10 has a floor 11, which may be laid on top of the floor of the car or which may be the floor of the car or other vehicle, and which is preferably made of wood. The floor 11, as shown in FIGURES 2 and 3, has a plurality of channels 12, 12 extending transversely thereof with the webs of the channels generally on the level of the top of the wooden floor 11 and the legs of the channels resting on beams 13 for the vehicle body and welded thereto as indicated by reference character 14. Each channel has a slot 15 extending therealong for a portion of the width of the car. The slot 15 registers with a slot 16 in an anchor member 17. The anchor member 17 is shown in FIGURE 3 as extending within the channel 12, and as being welded to the web thereof adjacent the slot 15 as indicated by reference character 18. While the channels 12 are shown in FIGURE 2 as extending entirely across the car, they may extend for only a portion of the width of the car, and need not be channels.

The anchor member 17 is shown in FIGURE 4 as being fabricated from two abutting channel-like members in which the legs of the channels face each other and are spaced apart by integrally formed lugs 19, 19 and are secured together along said lugs as by welding. The lugs and bottom surface of the anchor member 17 rest on the top surface of the flange of the beam 13.

The anchor member has inwardly extending legs 20, forming longitudinal continuations of the lugs 19 and forming a support for a slidable chain anchor 21 and accommodating said chain anchor to be adjustably moved along the tie anchor toward or from a stack of wallboard or other articles to be tied down. The anchor 17 also has inwardly extending upper legs or flanges 23, the inner margins of which are spaced from each other form the slot 16. The flanges or legs 23 have downwardly facing ratchet teeth formed integrally with their undersurfaces. The inner end portions of the flanges 20 and 23 of the anchor member 17 are connected together by rear walls 25, retaining the chain anchor from being pushed inwardly beyond said anchor member. The outer end portions of the anchor member are connected together by forward walls 26, leaving an opening therebetween.

The forward walls 26 enable the chain anchor to be moved beyond the ratchet teeth 24 and to be turned about the end of said tie anchor and be suspended therefrom when not in use to enable the chain anchor and its chain to be contained within a pocket 27 extending along the car body (FIGURE 1).

The chain anchors 21 at each side of the car body are slidably supported in a similar anchor member 17. Each chain anchor 21 has an upper apertured portion 29 for receiving a clevis 30, forming a connecting means for connecting a length of chain 31 thereto. The length of chain 31 is shown as extending from the chain anchor, through a piece of pipe or conduit 32, shown as being in the form of an elbow and as having a load protector 33 welded or otherwise secured to the inner side thereof. Each load protector 33 is shown as having two right angled faces conforming to the corner of the load, to protect the load from the chain 31 passing thereabout. The chain 31 on one side of the load is hooked to a turnbuckle or take-up 35 as by a hook 36. The chain 31 on the opposite side of the load is connected with a conventional form of cushioned chain or link 37 as by a clevis 38. The cushion chain or link is connected to the opposite end of the take-up 35 as by a connector 39, extending through the eye of an I-bolt 40 threaded within a sleeve 41 of the take-up 35. An I-bolt 43 is threaded in the opposite end of the sleeve and is connected to the hook 36 as by a link 44.

The sleeve 41 has a ratchet wheel 45 keyed or otherwise secured thereto engaged by a conventional ratchet 46, on a ratchet arm 47, to turn said sleeve and tighten or loosen the chain, upon pumping movement of said ratchet arm in a conventional manner, and no part of the present invention so not herein shown or described further.

Each chain anchor 21 is shown as having a relatively wide load engaging plate 48 backed up by a leg 49 extending at right angles to said load engaging plate and downwardly within the slot 16. The leg 49 has lugs 50 extending from opposite sides thereof and having ratchet teeth 51 cut therein and facing the ratchet teeth 24, to have interengagement therewith. The bottom surfaces of the lugs 50 slide along the flanges 20 and are supported thereon when moving the chain anchor into a selected position of adjustment. When the chain anchor 21 is supported on the flanges 20 on the lugs 50, 50 it may readily be adjustably moved along the tie anchor 17 until the load engaging face 48 thereof engages the side of the load. The chain anchor may then be held in position by pulling upwardly on its respective chain to engage the ratchet teeth 51 with the ratchet teeth 24.

A means is provided to retain the ratchet teeth 51 in engagement with the ratchet teeth 24 by the mere upward pulling movement on the chain anchor, which is herein shown as being a gravity lock 53. The gravity lock 53 is in the form of an eccentrically pivoted metal bar, pivoted at its upper end to the side of the leg 49 as by a pivot pin 55. The gravity lock 53 has a rounded or beveled undersurface 57 and normally rests on the outer surface of an associated flange or leg 23 at its inner edge portion at an angle with respect to the leg 24 as shown by broken lines in position A of FIGURE 5. In this position, the lugs 50 are resting on the flanges 20 and the ratchet teeth 51 are out of engagement with the ratchet teeth 24, and the chain anchor may be moved freely inwardly along the tie anchor 17 until the abutment face 48 comes into engagement with the stack of wallboard or other articles to be tied down. As the abutment face 48 is brought to the stack of board to be tied down, a pulling action is exerted on the chain 31, moving the teeth 51 into engagement with the teeth 24 and raising the gravity lock above the top surface fo the tie anchor 17. If tension on the chain should be released, the gravity lock 53 will come into engagement with the top surface of the tie anchor 17 and prevent downward movement of the chain anchor into position to disengage the teeth 51 from the teeth 24.

A latch bar 59 is freely mounted on a pin 60, extending perpendicular to the pin 50. The latch bar 59 is shown as being pivoted on the outer face of the leg 49 for movement along the outer side of the gravity lock 53 and over a lug 61 extending outwardly of the leg 49, and limiting downward movement of said latch bar. The latch bar 59 thus retains the gravity lock 53 in a locking position.

As the two chain anchors are placed in the proper position with respect to a stack of wallboard or other material to be tied down, and hooked together by the hook 36, tension of the chains may then be taken up by the take-up 35 to maintain the two chains and load protectors 33 into engagement with the load to hold the load in place.

It may be seen from the foregoing that an improved form of chain anchor has been provided for holding down loads to freight cars or trucks, and that the chain anchor is laterally adjustable and is readily locked in position by the person taking up on the load, by merely pulling upwardly on the chain anchor and accommodating the gravity lock to retain the ratchet teeth 51 from dropping out of engagement with the ratchet teeth 24.

It may further be seen that the chain anchor may readily be stowed beneath the floor of the car by turning about the end portion of the retaining and tie anchor structure therefor, and that while the adjustable tie anchor of the present invention is particularly adapted for retaining stacked flat material in position, it may readily be used to retain various other articles to a flat car or truck body, by simply adjusting the chain anchors inwardly into engagement with the stacked articles to be held into position and then pulling upwardly on the tie down chains, to lock the tie anchors in position, and that a rugged and simple form of anchoring structure has been devised providing a simple and dependable tying structure, which when once locked in position will be retained in its locked position until manually released.

While I have herein shown and described one form in which the invention may be embodied, it may readily be understood that various modifications and variations in the invention may be attained without departing from the spirit and scope of the novel concepts thereof.

I claim as my invention:

1. An anchoring device for anchoring the tie down chains for stacked loads on vehicles having a flat vehicle floor, comprising a tie anchor in the general form of two facing channels having spaced apart legs the inner faces of the lower of which legs form a slidable support and the inner faces of the upper of which legs have downwardly facing ratchet teeth extending therealong, a chain anchor mounted within said channels and extending thereabove and having a tie down chain connected thereto, said chain anchor resting on the lower legs of said channels for movement therealong and being movable upwardly out of engagement with said lower legs, to register the upwardly facing ratchet teeth thereon with the downwardly facing ratchet teeth on the upper of said legs, a gravity latch on said chain anchor freely pivoted thereon and movable in position to support said chain anchor on the upper of said legs and retain the ratchet teeth thereof from coming out of engagement with said downwardly facing ratchet teeth upon upward pulling movement on said chain anchor by grasping of the chain attached thereto, and the outer ends of said facing channels having closure flanges connecting said vertically spaced legs together and retaining said chain anchor to be moved downwardly about the outer ends of said channels and be supported on the lower legs of said channels, in depending relation with respect thereto when the chain anchor is not in use.

2. An anchoring device for anchoring the tie-down chains for stacked loads on the flat floor of a vehicle, comprising a tie anchor in the general form of two connected facing channels extending transversely of the floor of the vehicle and recessed therebeneath and having spaced apart horizontal legs, the inner faces of the lower of which legs form a slidable support and the inner faces of the upper of which legs have downwardly facing ratchet teeth extending therealong, a chain anchor mounted within said channels and extending thereabove and having an inner flat load engaging face disposed above said channels for engagement with the side of a stacked load and also having an upper apertured portion having a tie-down chain connected thereto and adapted to extend over the top of the stacked load, said chain anchor having a leg portion extending downwardly from said flat face within the space between said channels and resting on the lower legs of said channels for slidable movement therealong and also having lugs extending from opposite sides of said leg having upwardly facing ratchet teeth on the upper side thereof, and said chain anchor being movable upwardly out of engagement with said lower legs when in position to anchor a load, to register the upwardly facing ratchet teeth thereon with downwardly facing ratchet teeth on the upper of said legs and to retain said chain anchor from movement along said channels, and a gravity latch on said chain anchor disposed above said channels and freely pivoted to the side of said chain anchor and movable downwardly by gravity in position to engage the upper side of the upper of said legs by gravity and support said chain anchor thereon, and thereby retain the ratchet teeth of said chain anchor from coming out of engagement with the downwardly facing ratchet teeth of said channels, as said chain anchor is pulled upwardly by grasping of the chain attached thereto with the hand.

3. An adjustable anchoring device for anchoring stacked loads to freight cars and the like, comprising a tie anchor adapted to be recessed beneath the load supporting floor of the car and including two facing channels extending transversely of the car, secured together in facing spaced relation with respect to each other and having upper and lower facing horizontal legs, a chain anchor guided for movement along said channels and having a leg extending upwardly in the space between said channels and having a flat load engaging face disposed above said channels and engageable with the side of a stacked load, said leg being apertured for the attachment of a chain thereto, the portion of said leg beneath the upper horizontal legs of said channels having oppositely extending lugs normally supported on the upper surfaces of the lower of the horizontal legs of said channels for slidable movement therealong, said lugs having upwardly facing ratchet teeth extending upwardly from the top thereof, the upper of said horizontal legs of said channels having downwardly facing ratchet teeth spaced from said upwardly facing ratchet teeth when said lugs are supported on the lower of said horizontal legs of said channels, locking means for locking said facing ratchet teeth in engagement with each other upon the lifting of said tie anchor, comprising a gravity lock pivoted to said leg above said channels outwardly of said load engaging face eccentric of the center of said lock, and moving downwardly by gravity upon the lifting of said chain anchor by a chain and the like, to rest on the top surface of an associated channel and hold said chain anchor in an elevated position on said channel with the upwardly facing ratchet teeth thereof in engagement with the downwardly facing ratchet teeth of the upper horizontal legs of said channels.

4. An adjustable anchoring device for anchoring stacked loads to freight cars and the like, comprising a tie anchor adapted to be recessed beneath the load supporting floor of the freight car and including two spaced facing channels extending laterally of the car and having upper and lower horizontal legs, secured together in facing spaced relation with respect to each other along the lower horizontal legs thereof, a chain anchor guided for movement along said channels and extending upwardly therefrom in the space therebetween and having a flat load engaging face engageable with the side of the stacked load and also having a chain attached thereto adjacent the upper end thereof, said chain anchor having oppositely extending lugs normally resting on the inner surface of the lower of said legs for slidable movement therealong and having upwardly facing ratchet teeth, the upper of said horizontal legs having downwardly facing ratchet teeth spaced from said upwardly facing ratchet teeth when said lugs rest on the lower of said legs, locking means for locking said facing ratchet teeth in engagement with each other comprising a gravity lock pivoted to said chain anchor eccentric of the center thereof above the upper horizontal legs of said channel and adapted to rest on the top surface of a horizontal leg of said channel upon upwardly pulling movement of said chain anchor, means closing the legs of said channels at their outer ends to retain said chain anchor thereto and engaged by said lugs upon movement of said chain anchor to the outer ends of said channels and accommodating pivoting movement of said chain anchor about the ends of said channels into depending relation with respect to said channels for storing.

5. An anchoring device for anchoring the tie-down chains for stacked loads on vehicles having a flat vehicle floor, comprising a channel-like guide extending transversely of the floor and recessed therebeneath, said guide having upwardly inwardly facing horizontal legs spaced apart at their inner ends to form a slot extending transversely of the vehicle floor, the top surfaces of said inwardly facing horizontal legs being substantially flush with the surface of the floor of the vehicle, a chain anchor mounted in said channel-like guide for movement therealong and having a vertical leg extending upwardly through said slot with lugs beneath said horizontal legs extending from opposite sides of said vertical leg and supporting said vertical leg for movement along said guide and accommodating vertical movement of said vertical leg and lugs with respect to said guide, said vertical leg having an apertured upper end portion having a tie-down chain connected thereto, said horizontal legs of said channel-like guide having interlocking projections depending therefrom and said lugs extending laterally from said vertical leg having corresponding projections extending upwardly therefrom for interengagement with said depending projections, upon upward pulling movement of said vertical leg, a gravity lock mounted on said vertical leg above said horizontal legs and movable into position to support said chain anchor on the upper of said legs and retain the projections depending from said horizontal legs and extending upwardly from said lugs in interengagement with each other, and the outer end of said channel-like guide having closure members extending inwardly from opposite sides thereof and terminating at the inner margins at said slot and providing a vertical slot, and the lower portion of said channel-like guide having a slot extending therealong for a portion of the length thereof and forming a continuation of said vertical slot and accommodating said chain anchor to be moved downwardly about the outer end of said channel-like guide in depending relation with respect thereto for storing.

References Cited by the Examiner

UNITED STATES PATENTS

| | | | |
|---|---|---|---|
| 1,934,697 | 11/33 | Butterworth | 105—368 |
| 2,413,744 | 1/47 | Carter | 280—179 |
| 2,735,377 | 2/56 | Elsner | 105—369 |
| 3,092,368 | 6/63 | McDowell et al. | 248—361 X |

ARTHUR L. LA POINT, *Primary Examiner.*